US009772803B2

United States Patent
Jung et al.

(10) Patent No.: US 9,772,803 B2
(45) Date of Patent: Sep. 26, 2017

(54) SEMICONDUCTOR MEMORY DEVICE AND MEMORY SYSTEM

(71) Applicant: Samsung Electronics Co., Ltd., Suwon-si (KR)

(72) Inventors: Bu-Il Jung, Hwaseong-si (KR); So-Young Kim, Hwaseong-si (KR)

(73) Assignee: SAMSUNG ELECTRONICS CO., LTD., Yeongtong-gu, Suwon-si, Gyeonggi-do (KR)

( * ) Notice: Subject to any disclaimer, the term of this patent is extended or adjusted under 35 U.S.C. 154(b) by 758 days.

(21) Appl. No.: 14/104,574

(22) Filed: Dec. 12, 2013

(65) Prior Publication Data
US 2014/0173234 A1 Jun. 19, 2014

(30) Foreign Application Priority Data
Dec. 13, 2012 (KR) .................. 10-2012-0145094

(51) Int. Cl.
*G06F 12/00* (2006.01)
*G06F 3/06* (2006.01)
*G06F 12/02* (2006.01)

(52) U.S. Cl.
CPC ............ *G06F 3/0688* (2013.01); *G06F 3/064* (2013.01); *G06F 3/0616* (2013.01); *G06F 12/0246* (2013.01); *G06F 2212/7211* (2013.01)

(58) Field of Classification Search
CPC ..... G06F 2212/7211; G06F 2212/2022; G06F 2212/7201
See application file for complete search history.

(56) References Cited

U.S. PATENT DOCUMENTS

| 7,328,301 | B2 | 2/2008 | Eilert et al. | |
| 8,601,202 | B1* | 12/2013 | Melcher | G06F 12/0246 711/103 |
| 9,158,672 | B1* | 10/2015 | Zheng | G06F 12/0246 |
| 2002/0041517 | A1 | 4/2002 | Kim et al. | |
| 2003/0065899 | A1 | 4/2003 | Gorobets | |
| 2004/0109376 | A1 | 6/2004 | Lin | |
| 2006/0285410 | A1* | 12/2006 | Hummler | G06F 11/106 365/222 |
| 2009/0168524 | A1 | 7/2009 | Golov et al. | |
| 2009/0259819 | A1* | 10/2009 | Chen | G06F 13/4239 711/165 |
| 2010/0226183 | A1 | 9/2010 | Kim | |
| 2013/0311705 | A1* | 11/2013 | Cheng | G06F 12/0246 711/103 |

* cited by examiner

*Primary Examiner* — David X Yi
*Assistant Examiner* — Arvind Talukdar
(74) *Attorney, Agent, or Firm* — Muir Patent Law, PLLC

(57) ABSTRACT

A semiconductor memory system or device includes a memory cell array and an address converter. The memory cell array includes a plurality of memory blocks, and there is at least one block that serves as a buffer. Each of the memory blocks includes at least one memory cell row. An address converting circuit along with a block copy circuit performs a block copy operation of copying data of a first memory block, which is a source block among the memory blocks, into a second block, which is a buffer or destination block, and maps a first logical address for accessing the first memory block onto a physical address designating the second block. The first memory block then can serve as a new destination block after the block copy operation of the first memory block is completed.

15 Claims, 12 Drawing Sheets

FIG. 6

| | t=0 | t=1 | t=2 | t=3 | t=4 | t=5 | t=6 | t=7 | t=8 | t=9 |
|---|---|---|---|---|---|---|---|---|---|---|
| BBLK | NONE | 1 | 1 | 1 | 1 | NONE | 2 | 2 | 2 | 2 |
| PBLK1 | 1 | NONE | 2 | 2 | 2 | 2 | NONE | 3 | 3 | 3 |
| PBLK2 | 2 | 2 | NONE | 3 | 3 | 3 | 3 | NONE | 4 | 4 |
| PBLK3 | 3 | 3 | 3 | NONE | 4 | 4 | 4 | 4 | NONE | 1 |
| PBLK4 | 4 | 4 | 4 | 4 | NONE | 1 | 1 | 1 | 1 | NONE |

| | t=10 | t=11 | t=12 | t=13 | t=14 | t=15 | t=16 | t=17 | t=18 | t=19 | t=20 |
|---|---|---|---|---|---|---|---|---|---|---|---|
| BBLK | NONE | 3 | 3 | 3 | 3 | NONE | 4 | 4 | 4 | 4 | NONE |
| PBLK1 | 3 | NONE | 4 | 4 | 4 | 4 | NONE | 1 | 1 | 1 | 1 |
| PBLK2 | 4 | 4 | NONE | 1 | 1 | 1 | 1 | NONE | 2 | 2 | 2 |
| PBLK3 | 1 | 1 | 1 | NONE | 2 | 2 | 2 | 2 | NONE | 3 | 3 |
| PBLK4 | 2 | 2 | 2 | 2 | NONE | 3 | 3 | 3 | 3 | NONE | 4 |

SEMICONDUCTOR MEMORY DEVICE AND MEMORY SYSTEM

CROSS-REFERENCE TO RELATED APPLICATION

This application claims priority under 35 USC §119 to Korean Patent Application No. 10-2012-0145094, filed on Dec. 13, 2012, in the Korean Intellectual Property Office (KIPO), the content of which is herein incorporated by reference in its entirety.

BACKGROUND

The disclosure relates generally to memory systems and devices, and more particularly to semiconductor memory systems and devices in which the mapping or translation of logical addresses to physical addresses for memory regions within the device may be updated.

In a system of using a semiconductor memory device, the usage frequency of a certain region in a memory cell array may be greater than that of other regions. What can be referred to as one-row concentration access problems may occur. As compared with a region having a low usage frequency, the memory cell array region having a high usage frequency may negatively affect reliability and reduce the guaranteed durability of a memory product.

SUMMARY

Exemplary embodiments provide semiconductor memory systems and/or devices capable of providing uniform wear-leveling.

According to some example embodiments, a semiconductor memory device includes a memory cell array, a block copy circuit and an address converter or address converting circuit. The memory cell array may include a plurality of memory blocks and at least one buffer block, and each of the memory blocks may include at least one memory cell row. The block copy circuit performs a block copy operation of copying data of a first memory block, which is a source block among the memory blocks, into a second block or buffer block, which is a destination block. In various embodiments a block copy operation may include copying less than a single block, copying a single block, or copying multiple blocks. The address converter maps a first logical address for accessing the first memory block onto a physical address designating the second block or buffer block. The first memory block can serve as a new destination block after the block copy operation of the first memory block is completed.

In an embodiment, the address converter/converting circuit may sequentially perform the block copy operation for second to $n^{th}$ blocks of the memory blocks and maps logical addresses of each memory block onto physical addresses of corresponding destination blocks after each corresponding block copy operation is completed.

The address converter/converting circuit may include a mapping table configured to store physical addresses that designate the memory blocks and logical addresses corresponding to the physical addresses, respectively. Circuitry configured to update a corresponding physical address stored in the mapping table after the block copy operation is completed may be provided. An address mapping unit may be configured to map the logical address for accessing the memory blocks onto physical addresses based on the mapping table after the block copy operation is completed.

In some embodiments, the address converter/converting circuit may be configured to update a physical address of the first, or source, block stored in the mapping table into a physical address of the destination block after the block copy operation for one of the memory blocks is completed.

The block copy circuit may be configured to perform a partial copy operation to copy a portion of the data of the source block into the destination block when the block copy operation is performed. The block copy unit may repeat the partial copy operation until all of the data of the source block are copied into the destination block, and may change the physical address of the source block stored in the mapping table into the physical address of the destination block after all data from the first block have been copied.

In some embodiments, the address converter may include a block copy unit configured to perform the block copy operation for the memory blocks and to provide mapping information for the memory blocks in which the block copy operation is completed, the memory block currently subject to the block copy operation, and the memory block serving as the buffer block. A mapping calculation unit may be configured to generate a mapping index of the memory blocks based on the mapping information. An address mapping unit may be configured to map the logical address for accessing the memory blocks onto physical addresses based on the mapping index after the block copy operation is completed. The mapping index may designate the physical addresses in a form of a pointer.

In some embodiments, the block copy operation for a memory block may be performed while a refresh command for the memory cell array is performed.

Control logic may be provided that is configured to sequentially make each memory block of the plurality of memory blocks available as a first block so that after a sequence of block copy operations reaches a number equal to the number of memory blocks in the plurality of memory blocks then the block copy operation has used each memory block as the first memory block.

In some embodiments, at least one buffer block may include a plurality of buffer cells corresponding to each of the memory cells included in each of the memory cell rows, and each of the buffer cells and each of corresponding memory cells may be connected to the same bit line sensing amplifier. The block copy unit may be configured to by activate a source word line connected to memory cells of the first or source block to allow the bit line sensing amplifier to sense data and then to deactivate the source word line while activating a destination word line connected to the second or destination block to overwrite the sensed data onto cells of the second or destination blocks.

According to some example embodiments, a memory system includes a semiconductor memory device and a memory controller configured to control an operation of the memory device. The memory device includes a memory cell array that includes a plurality of memory blocks, each of which includes at least one memory cell row. An address converting circuit is configured to perform a block copy operation of copying data of a first memory block, which is a source block among the memory blocks, into a buffer block, which is a destination block. The address converting circuit is also configured to map a first logical address for accessing the first memory block into a physical buffer address designating the buffer block. The first memory block serves as a new destination block after the first block copy operation of the first memory block is completed.

A semiconductor memory system may include a memory cell array with a plurality of memory blocks that each has at least one memory cell row. A plurality of bit line sense amplifiers may each be coupled to memory cell rows in each memory block. A memory controller including a block copy unit may be configured to perform block copy operations of data from a source memory block to a buffer memory block. An address converting unit may be configured to map a logical address for the source memory block to a physical address of the buffer memory block. The memory controller may further be configured to make the source memory block available as a destination block for receiving data after completion of the block copy operation.

In an embodiment, the buffer block may be included in the memory cell array.

In another embodiment, the buffer block may be included in the memory controller. The block copy unit may perform the block copy operation for all or part of the source block.

When the block copy operation is performed for part of the source block, the block copy operation may be performed by using a write operation and a read-out operation between the semiconductor memory device and the memory controller.

According to exemplary embodiments, a memory system comprises a semiconductor memory device with a plurality of memory blocks, an address converter that maps logical memory addresses to physical memory addresses for the memory device, a block copy unit that transfers data from source blocks to destination blocks in the memory device, and a memory controller that receives and responds to memory access requests from a host system. The memory system may be configured to cause the block copy unit to transfer data from a source block to a destination block when the host system requests access to a logical address that maps to a physical address of the memory device.

According to exemplary embodiments, methods of distributing physical accesses in a semiconductor memory device are provided. A memory array comprising plurality of memory blocks may be provided, each memory block comprising at least one row of memory cells, along with at least one bit line sense amplifier coupled to the row of memory cells of each of the plurality of memory blocks. Data is read from a first memory block using the at least one shared bit line sense amplifier. The data obtained from reading from the first memory block may be written to a second memory block using the at least one shared bit line sense amplifier. The logical address for the first memory block may be mapped to the physical address for the second memory block.

Exemplary methods may include repeatedly reading from a first memory block and writing to a second memory block using the shared bit line sense amplifier and then mapping the first memory block's logical address to the second memory block's physical address across the memory array, where each memory block in the array is used as the second block in response to a consecutive number of accesses of the memory array by a host system of logical addresses of memory blocks that equals the number of memory blocks in the memory array.

Other exemplary methods may include repeatedly reading from a first memory block and writing to second memory block using the shared bit line sense amplifier and then mapping the first memory block's logical address to the second memory block's physical address across the memory array in a predetermined pattern, where each memory block in the array is used as a second memory block.

Still other exemplary methods may include providing a memory controller coupled to the memory array and controlling the determination of the second memory block addresses with the controller so that each memory block in the memory array is written to sequentially in response to a consecutive number of accesses of the memory array by a host system.

Yet still other exemplary methods may include controlling the determination of second memory block addresses with a memory controller so that over time, in response to accesses of the memory array by a host system, each memory block in the memory array is written to approximately an equal number of times.

In variations of the foregoing embodiments, either the memory device or the memory controller can include the address converter or the block copy unit, or both. The memory system may be configured to cause the block copy unit to transfer data every time a host system requests an access of the memory device. A block copy operation may be configured to be performed sequentially on second to $n^{th}$ physical blocks of the memory device based on second to $n^{th}$ consecutive accesses by the host system of logical memory blocks that map to the memory device.

According to various embodiments, when converting the logical address into a physical address of a memory cell according to an access request, the block copy operation is performed and the corresponding physical address is updated. Thus, even though a logical address may be intensively accessed, the accesses can be uniformly distributed across physical blocks within the memory device.

BRIEF DESCRIPTION OF THE DRAWINGS

Features will become apparent to those of ordinary skill in the art by describing in detail exemplary embodiments with reference to the attached drawings in which:

FIG. 6 is a table illustrating another view of an operation of another embodiment of an address converter;

DETAILED DESCRIPTION OF THE EMBODIMENTS

Figure 1:
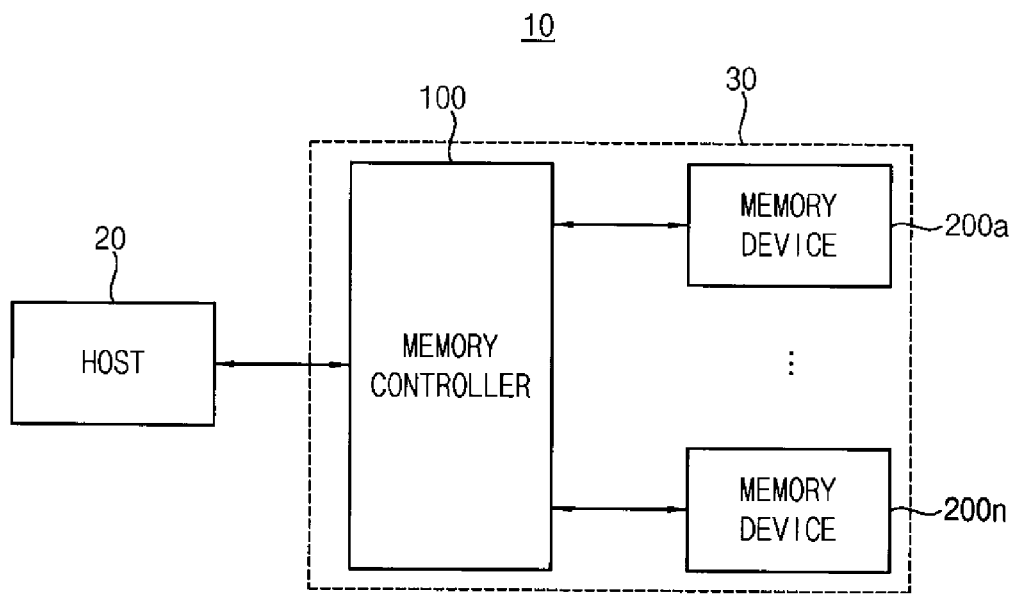
FIG. 1 is a block diagram showing an electronic system including an embodiment of a memory system.

Various example embodiments will be described more fully with reference to the accompanying drawings, in which various embodiments are shown. The inventions as described and claimed herein may, however, be embodied in many different forms and should not be construed as limited to the embodiments set forth herein. Rather, these embodiments are provided so that this disclosure will convey the scope of the inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the disclosure and claims. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, steps, operations, elements, and/or components, but do not preclude the presence or addition of one or more others.

Unless otherwise defined, all terms (including technical and scientific terms) used herein have the same meaning as commonly understood by one of ordinary skill in the technology of this disclosure. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, example embodiments will be explained in detail with reference to the accompanying drawings. The same reference numerals will be used to refer to the same elements throughout the drawings and detailed description of the same elements will be omitted in order to avoid redundancy.

Referring to the example of FIG. 1, an electronic system 10 includes a host 20 and a memory system 30. The memory system 30 may include a memory controller 100 and a plurality of memory devices 200a to 200n.

The host may communicate with the memory system 300 by using an interface protocol such as PCI-E (Peripheral Component Interconnect-Express), ATA (Advanced Technology Attachment), SATA (Serial ATA), PATA (Parallel ATA) or SAS (Serial Attached SCSI). The interface protocol between the host 20 and the memory system 30 is not limited to the above, and may include one or more other interface protocols such as USB (Universal Serial Bus), MMC (Multi-Media Card), ESDI (Enhanced Small Disk Interface) and IDE (Integrated Drive Electronics), etc.

The memory controller 100 controls operations of the memory system 30 and controls the data exchange between the host 20 and the memory devices 200a to 200n. For example, the memory controller 100 controls the memory devices 200a to 200n according to a request from the host 200, such that data are written into or read out from the memory devices 200a to 200n.

According to example embodiments, each of the memory devices 200a to 200n may be a DRAM (Dynamic Random Access Memory) such as DDR SDRAM (Double Data Rate Synchronous Dynamic Random Access Memory), LPDDR (Low Power Double Data Rate) SDRAM, GDDR (Graphics Double Data Rate) SDRAM or RDRAM (Rambus Dynamic Random Access Memory).

Figure 2:
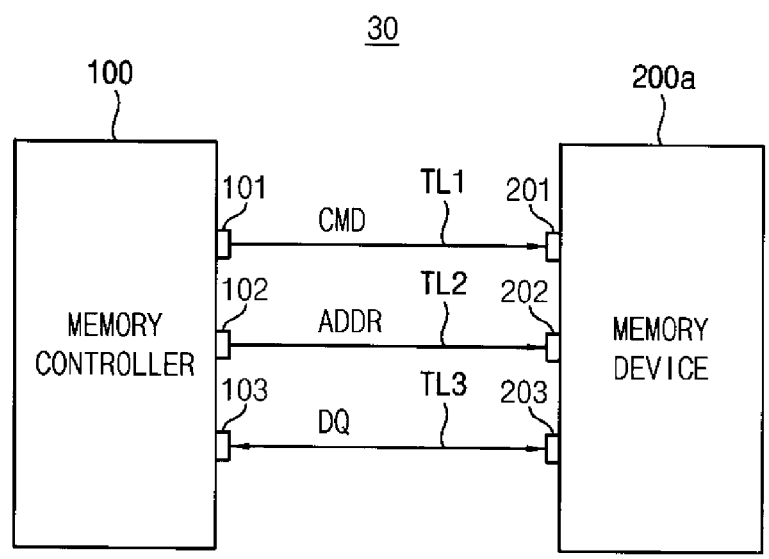
FIG. 2 is a block diagram showing details of an embodiment of a memory controller and memory device in the memory system of FIG. 1.

Referring to FIG. 2, an example of a memory system 30 may include the memory controller 100 and one memory device 200a. The memory controller 100 and the memory device 200a may be connected to each other through corresponding command pins 101 and 201, address pin 102 and 202, and data pins 103 and 203. The command pins 101 and 201 may transmit a command signal CMD through a command transmission line TL1, the address pins 102 and 202 may transmit an address signal_ADDR through an address transmission line TL2, and the data pins 103 and 203 may transmit data DQ through a data transmission line TL3.

Referring to FIGS. 1 and 2, the memory controller 100 may input or output data to or from the memory device 200a through the data pins 103 and 203 according to a request from the host 20. The memory controller 100 may input or output an address to or from the memory device 200a through the address pins 102 and 202.

Figure 3:
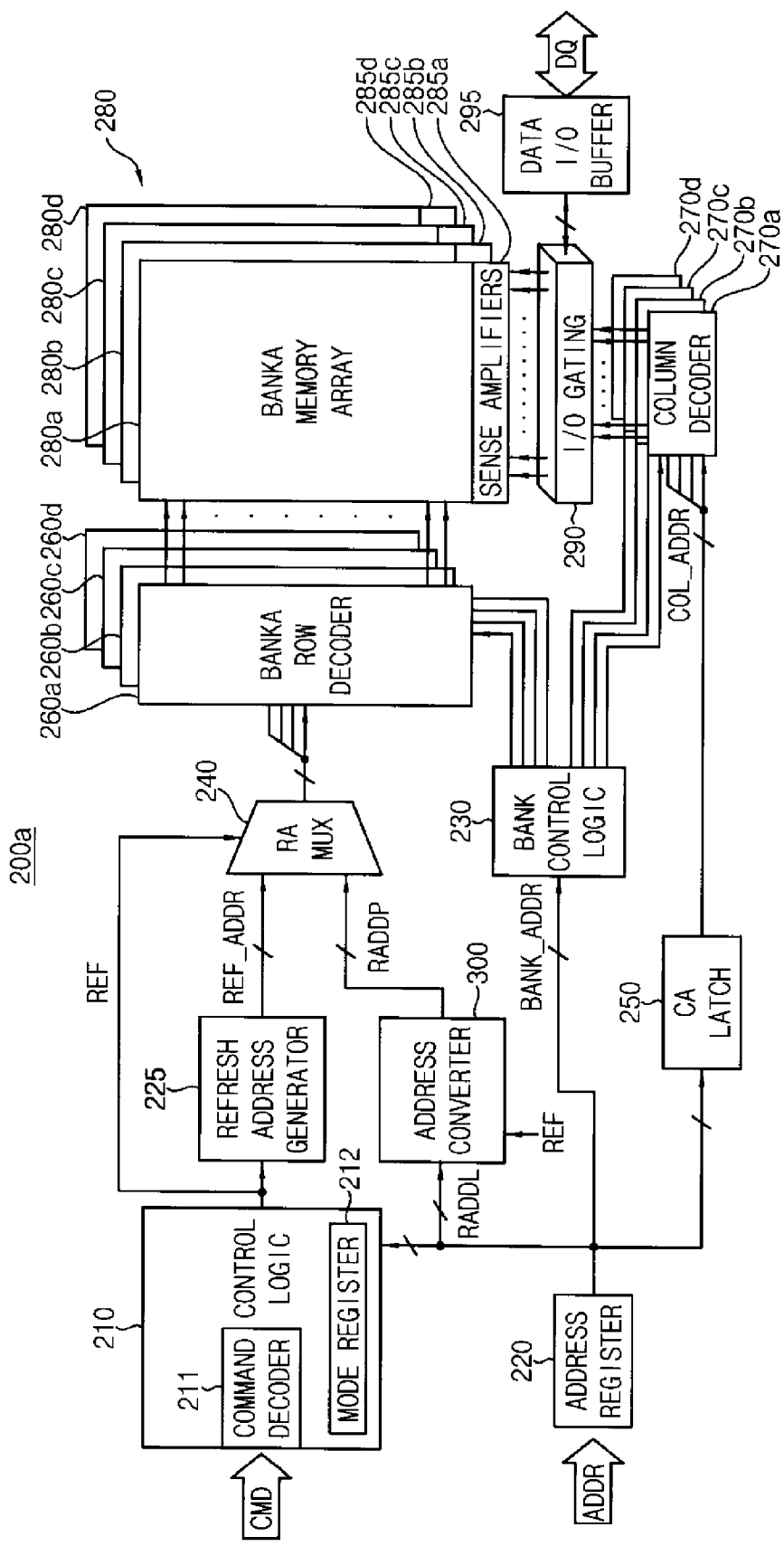
FIG. 3 is a block diagram illustrating embodiments of the memory device in FIG. 2.

Referring to FIG. 3, an embodiment of the semiconductor memory device 200a may include control logic 210, an address register 220, a refresh address generator 225, bank control logic 230, a row address multiplexer 240, a column address latch 250, one or more row decoders, one or more column decoders, a memory cell array 280, one or more sense amplifiers, an input/output gating circuit 290, a data input/output buffer 295, a refresh address generator 225, and an address converting circuit 300. In some embodiments, the memory device 200a may be a volatile memory such as dynamic random access memory (DRAM), for example a double data rate synchronous dynamic random access memory (DDR SDRAM), a low power double data rate synchronous dynamic random access memory (LPDDR SDRAM), a graphics double data rate synchronous dynamic random access memory (GDDR SDRAM), a Rambus dynamic random access memory (RDRAM), etc., or may be other memory types such as volatile memory devices that require a refresh operation.

The memory cell array 280 may include first through fourth memory bank arrays 280a, 280b, 280c and 280d. The row decoder(s) may include first through fourth bank row decoders 260a, 260b, 260c and 260d respectively coupled to the first through fourth bank arrays 280a, 280b, 280c and 280d. The column decoder(s) may include first through fourth bank column decoders 270a, 270b, 270c and 270d respectively coupled to the first through fourth bank arrays 280a, 280b, 280c and 280d. The sense amplifier(s) may include first through fourth bank sense amplifiers 285a, 285b, 285c and 285d respectively coupled to the first through fourth bank arrays 280a, 280b, 280c and 280d. The first through fourth bank arrays 280a, 280b, 280c and 280d, the first through fourth bank row decoders 260a, 260b, 260c and 260d, the first through fourth bank column decoders 270a, 270b, 270c and 270d and the first through fourth bank sense amplifiers 285a, 285b, 285c and 285d may form first through fourth banks. Although the memory device 200a is illustrated in FIG. 3 as including four banks, it may include any number of banks.

The address register 220 may receive an address_ADDR including a bank address BANK_ADDR, a row address ROW_ADDR and a column address COL_ADDR from a memory controller (not shown). The address register 220 may provide the received bank address BANK_ADDR to the bank control logic 230, may provide the received row address ROW_ADDR to the row address multiplexer 240 (through the address converter 300), and may provide the received column address COL_ADDR to the column address latch 250.

The address converting circuit 300 converts a received row address (or logical row address) RADDL into a physical row address RADDP which designates a memory cell row of the memory cell array 280 and provides the physical row address RADDP to the row address multiplexer 240. When converting the logical row address RADDL into the physical row address RADDP, the address converting circuit 300 performs a block copy operation of copying the data of a source block, which is one of the memory blocks constituting the memory cell array 280, into a buffer block which serves as a destination block included in the memory cell array 280. The address converter 300 maps the logical row address for accessing the source block onto the physical row address for designating the destination block (in other words, an address translation or mapping conversion operation). The address converting circuit 300 may sequentially perform the block copy operation and the address mapping operation for all memory blocks included in the memory cell array 280. Thus, even though a specific logical row address RADDL may be intensively accessed, the physical row addresses RADDP actually accessed may be uniformly spread out in the memory cell array 280.

The bank control logic 230 may generate bank control signals in response to the bank address BANK_ADDR. One of the first through fourth bank row decoders 260a, 260b, 260c and 260d corresponding to the bank address BANK_ADDR may be activated in response to the bank control signals, and one of the first through fourth bank column decoders 270a, 270b, 270c and 270d corresponding to the bank address BANK_ADDR may be activated in response to the bank control signals.

The row address multiplexer 240 may receive the physical row address RADDP from the address converting circuit 300, and may receive a refresh row address REF_ADDR from the refresh address generator 225. The row address multiplexer 240 may selectively output the physical row address RADDP or the refresh row address REF_ADDR in response to a refresh signal REF. The refresh signal REF may be generated based on an auto refresh command from the memory controller 100, or internally generated in a self-refresh mode of the volatile memory device 200a. A row address output from the row address multiplexer 240 may be applied to the first through fourth bank row decoders 260a, 260b, 260c and 260d.

The activated one of the first through fourth bank row decoders 260a, 260b, 260c and 260d may decode the row address output from the row address multiplexer 240, and may activate a word line corresponding to the row address. For example, the activated bank row decoder may apply a word line driving voltage to the word line corresponding to the row address.

The column address latch 250 may receive the column address COL_ADDR from the address register 220, and may temporarily store the received column address COL_ADDR. In some embodiments, in a burst mode, the column address latch 250 may generate column addresses that increment from the received column address COL_ADDR. The column address latch 250 may apply the temporarily stored or generated column address to the first through fourth bank column decoders 270a, 270b, 270c and 270d.

The activated one of the first through fourth bank column decoders 270a, 270b, 270c and 270d may decode the column address COL_ADDR output from the column address latch 250, and may control the input/output gating circuit 290 to output data corresponding to the column address COL_ADDR.

The input/output gating circuit 290 may include circuitry for gating input/output data. The input/output gating circuit 290 may further include input data mask logic, read data latches for storing data output from the first through fourth bank arrays 280a, 280b, 280c and 280d, and write drivers for writing data to the first through fourth bank arrays 280a, 280b, 280c and 280d.

Data DQ to be read from one bank array of the first through fourth bank arrays 280a, 280b, 280c and 280d may be sensed by a sense amplifier coupled to the one bank array, and may be stored in the read data latches. The data DQ stored in the read data latches may be provided to the memory controller via the data input/output buffer 295. Data DQ to be written to one bank array of the first through fourth bank arrays 280a, 280b, 280c and 280d may be provide from the memory controller to the data input/output buffer 295. The data DQ provided to the data input/output buffer 295 may be written to one of the array banks 280a, 280b, 280c and 280d via write drivers.

The control logic 210 may control operations of the memory device 200a. For example, the control logic 210 may generate control signals for the memory device 200a to perform a write operation or a read operation. The control logic 210 may include a command decoder 211 that decodes a command CMD received from the memory controller and a mode register 212 that sets an operation mode of the volatile memory device 200a. For example, the command decoder 211 may generate the control signals corresponding to the command CMD by decoding a write enable signal (/WE), a row address strobe signal (/RAS), a column address strobe signal (/CAS), a chip select signal (/CS), etc. The command decoder 211 may further receive a clock signal (CLK) and a clock enable signal (/CKE) for operating the volatile memory device 200a in a synchronous manner. The control logic 210 may control the refresh control circuit (address generator) 225 to generate the changed refresh row address REF_ADDR. That is, the control logic 210 may control the refresh control circuit 225 to perform a self refresh operation on the memory cell array in a power down mode of the memory device 200a.

The control logic 210 may control the address converting circuit 300 such that it performs the block copy operation and the address mapping conversion operation. The block copy operation and the address mapping conversion operation may be performed when a refresh operation, by which a normal access operation for the memory cell array 280 is not operated, is operated. The address converter 300 may perform the block copy operation and the address mapping conversion operation in response to a refresh command REF.

Figure 4A:
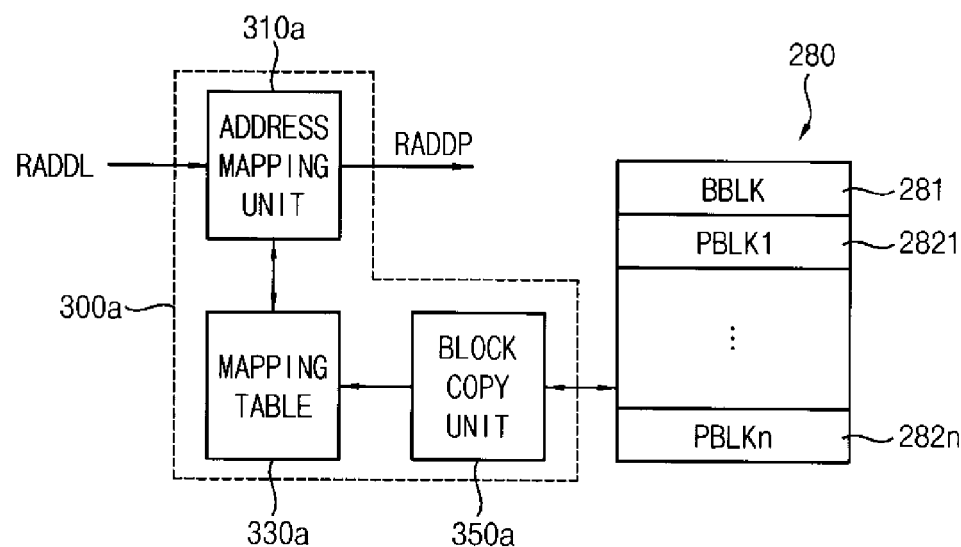
FIG. 4A is a block diagram showing details of an embodiment of an address converter and memory cell array for use in a device of FIG. 3.

Referring now to FIG. 4A, the memory cell array 280 may include at least one buffer block 281 and a plurality of memory blocks 2821 to 282n. Each of the memory blocks 2821 to 282n may include at least one memory cell and the buffer block 281 may include memory cell rows, the number of which is the same as that of each of the memory blocks 2821 to 282n. Although one buffer block 281 is depicted in FIG. 4A, the memory cell array 280 may include a plurality of buffer blocks. The address converting circuit 300a may include an address mapping unit 310a, a mapping table 330a and a block copy unit 350a.

The mapping table 330a stores physical row addresses (hereinafter, referred to as physical addresses) for designating the memory blocks 2821 to 282n and logical row addresses (hereinafter, referred to as logical addresses) corresponding to each of the physical addresses. The block copy unit 350a performs the block copy operation for the memory blocks 2821 to 282n, and after completing the block copy operation, updates the corresponding physical address stored in the mapping table 330a (that is, the physical address of the source block) into the physical address after completing the block copy operation (that is, the physical address of the destination block). The address mapping unit 310a maps the logical addresses for accessing the memory blocks 2821 to 282n to the physical addresses after completing the block copy operation. Thus, even though any particular logical address may be intensively accessed, the accesses may be uniformly distributed across multiple physical blocks in the memory cell array 280.

When performing the block copy operation for the memory blocks 2821 to 282n, the block copy unit 350a may update the corresponding physical address after copying entire data of the memory block into the source block. When performing the block copy operation for the memory blocks 2821 to 282n, the block copy unit 350a may update the corresponding physical address after performing a partial copy operation of copying a portion of data in one memory block at several times. When the source block includes at least one failed cell, the block copy unit 350a may skip the block copy operation of the memory block including the failed cell. Further, when the source block is a redundancy block including redundancy cells, the block copy unit 350a may perform the block copy operation for the redundancy block. The address converting circuit 300a may provide a concurrent relocation function for the physical addresses of the memory blocks 2821 to 282n.

Figure 5A:
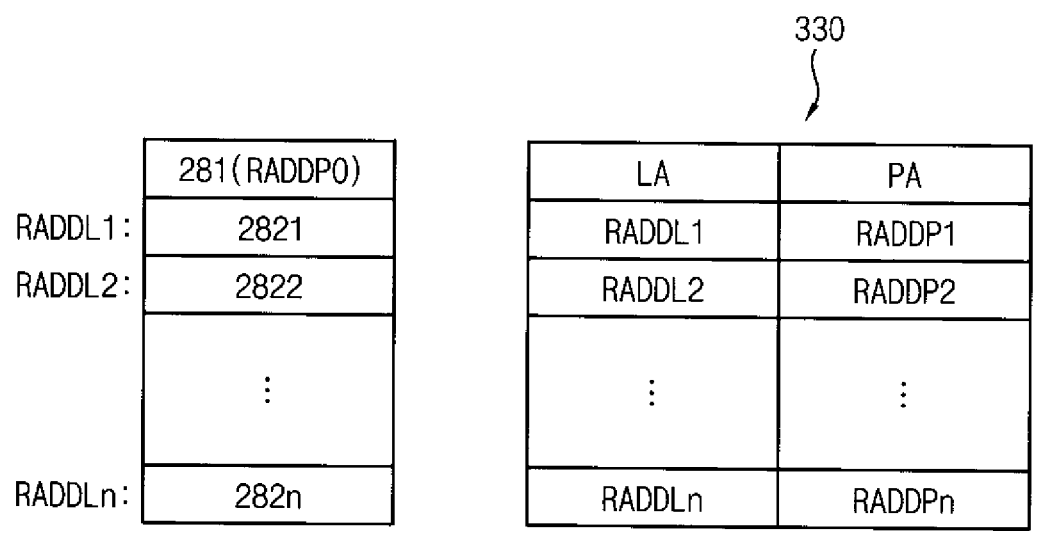
FIGS. 5A to 5C are tables illustrating an operation of an embodiment of an address converter.

Referring to FIG. 5A, it may be understood that the physical address of the buffer block 281 is RADDP0, the memory blocks 2821 to 282n correspond to logical addresses (RADDL1~RADDLn), respectively, and the logical addresses (RADDL1~RADDLn) are mapped to the physical addresses (RADDP1~RADDPn) of the memory blocks 2821 to 282n, respectively. FIG. 5A shows a state before a block copy operation for the memory cell array 280 is performed.

Figure 5B:
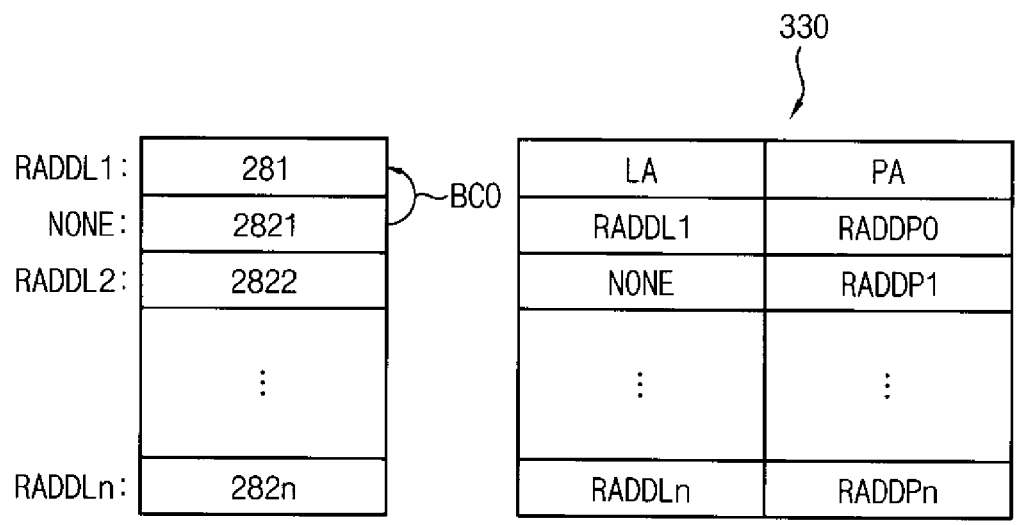

Referring to FIG. 5B, it may be understood that a logical address (RADDL1) corresponds to the buffer block 281 and the first memory block 2821 does not correspond to any logical addresses after the data of the first memory block 2821 is copied into the buffer block 281. Further, it may be understood that the logical addresses (RADDL1~RADDLn) are mapped to the physical address (RADDP0) of the buffer block 281 and the physical addresses (RADDP2~RADDDPn) of the memory blocks 2822 to 282n, respectively. In this case, the first memory block 2821 may work as a new buffer block.

Figure 5C:
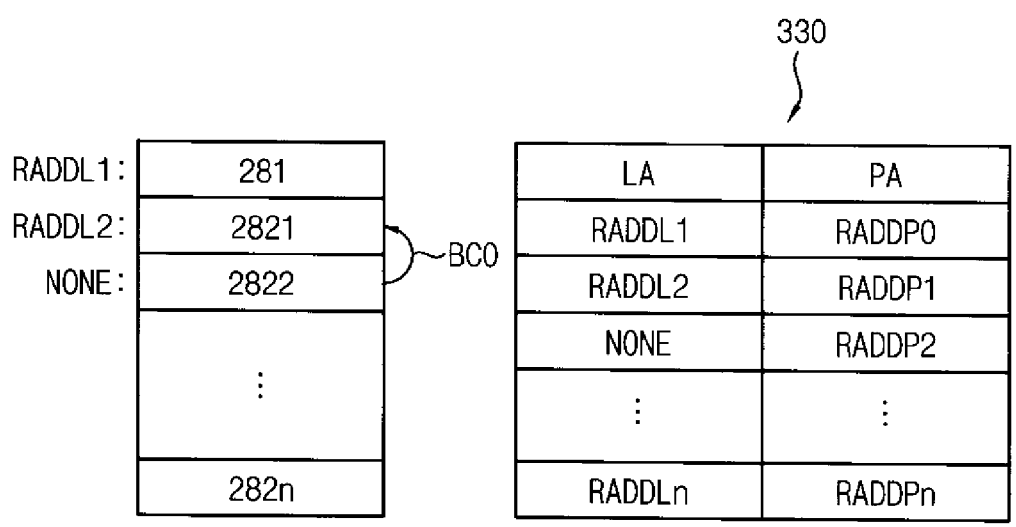

Referring to FIG. 5C, it may be understood that a logical address (RADDL2) corresponds to the first memory block 2821 and the second memory block 2822 does not correspond to any logical addresses after the data of the second memory block 2822 is copied into the first memory block 2821 as a new buffer block. Further, it may be understood that the logical addresses (RADDL1~RADDLn) are mapped to the physical address (RADDP0) of the buffer block 281 and the physical addresses (RADDP1, RADDP3~RADDDPn) of the memory blocks 2821 and 2823 to 282n, respectively. In this case, the second memory block 2822 may work as a new buffer block. As described above, the block copy unit 350 sequentially performs the block copy operation for the memory block and updates the physical address for the memory block.

Referring now to FIG. 6 a mapping conversion is shown of a physical address when the memory cell of FIG. 4A includes one buffer block and four memory blocks, that is, n=4.

In FIG. 6, numerals of 1 to 4 in each table denote logical addresses mapped onto the buffer block (BBLK) and the memory blocks (PBLK1 to PBLK4). It may be understood from FIG. 6 that as t increments from 0 to 20 there is a shift of the mapping of the logical addresses to the physical addresses every time that a block copy operation of a memory block is completed.

It can be seen from FIG. 6 that with one buffer block and n memory blocks, n+1 block copy operations return the address mapping to its initial state. A result will be that even if one or more logical addresses are accessed more often, the physical accesses of the memory blocks are uniformly distributed. In other words, the access of each memory block over time will converge to 1/(n+1), thereby achieving uniform wear-leveling over time.

Figure 4B:
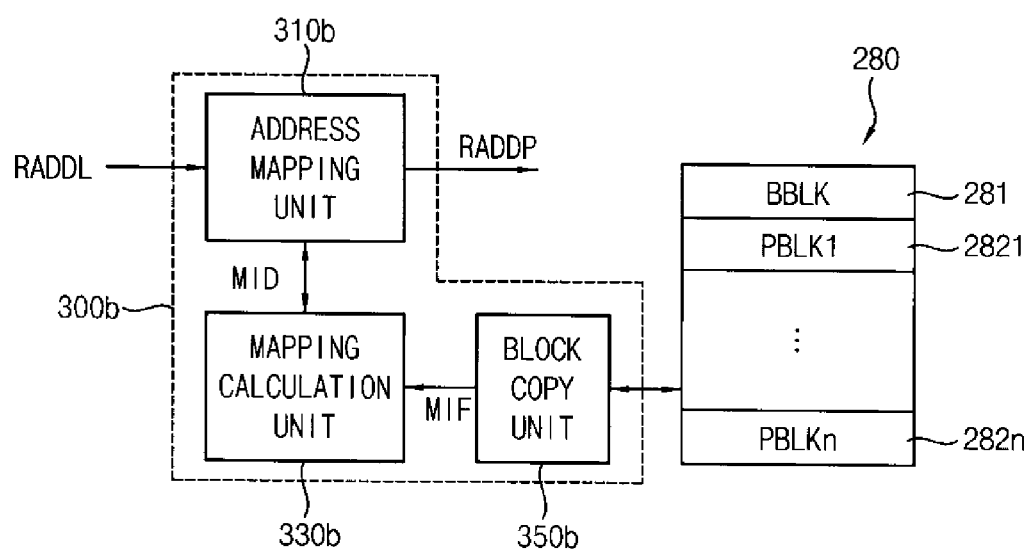
FIG. 4B is a block diagram showing another embodiment of an address converter and memory cell array for use in a device of FIG. 3.

Referring to FIG. 4B, the memory cell array 280 may include at least one buffer block 281 and a plurality of memory blocks 2821 to 282n. Each of the memory blocks 2821 to 282n may include at least one memory cell and the buffer block 281 may include memory cell rows, the number of which is the same as that of each of the memory blocks 2821 to 282n. Although one buffer block 281 is depicted in FIG. 4B, the memory cell array 280 may include a plurality of buffer blocks. The address converting circuit 300b may include an address mapping unit 310b, a mapping calculation unit 330b and a block copy unit 350b.

The block copy unit 350b performs the block copy operation for the memory blocks 2821 to 282n, and provides mapping information about the memory blocks in which the block copy operation is completed, the memory blocks which are currently performing the block copy operation, and the memory block which serves as the buffer block, to the mapping calculation unit 330b. The mapping calculation unit 330b generates a mapping index MID about the address mapping which is currently being performed, based on the mapping information MIF, and provides the mapping index MID to the address mapping unit 310b. In this case, the mapping index MID may designate the physical addresses of the memory blocks in which the block copy operation is completed, the memory blocks which are currently performing the block copy operation, and the memory block which serves as the buffer block, in a pointer type. The address mapping unit 310a maps the logical addresses RADDL for accessing the memory blocks 2821 to 282n onto the physical addresses RADDP after completing the block copy operation with reference to the mapping index MID provided from the mapping calculation unit 330b. Thus, even though a logical address is intensively accessed, the accesses may be uniformly distributed in the memory cell array 280.

Figure 7:
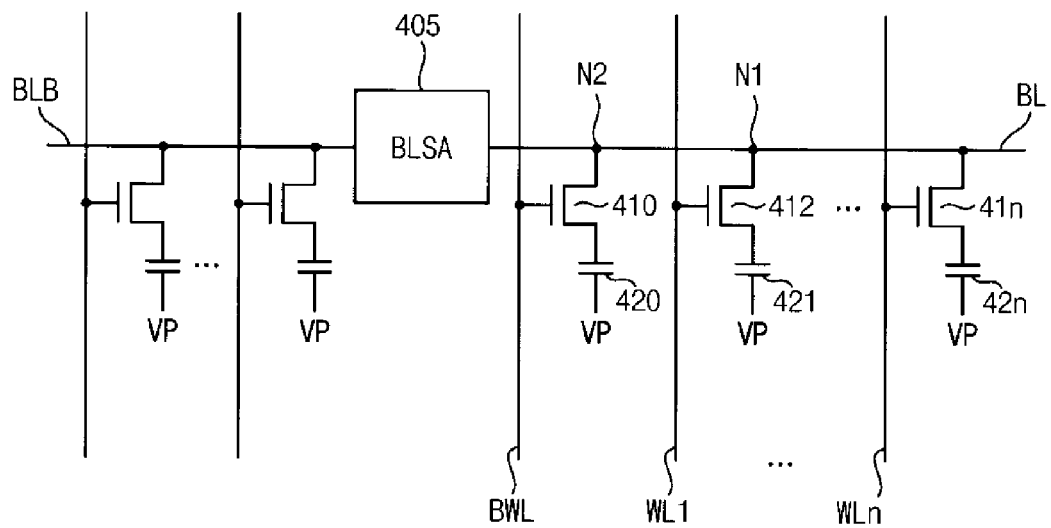
FIG. 7 is a circuit diagram showing a bit line sense amplifier coupled to multiple word lines for use in embodiments of a memory device.

Referring to FIG. 7, a bit line sensing amplifier 405 is connected between a bit line BL and a complementary bit line BLB. A buffer word line BWL and a plurality word lines WL1 to WLn are connected to the bit line BL. An access transistor 410 is connected to the buffer word line BWL and the bit line BL, and a cell capacitor 420 is connected between the access transistor 410 and a plate voltage VP. A plurality of cells, each of which includes an access transistor 410 and a cell capacitor 420, is connected to the buffer word line BWL, so that the buffer block 281 of FIG. 4 may be configured with a desired number of memory cells. An access transistor 412 is connected to the word line WL1 and the bit line BL, and a cell capacitor 421 is connected between the access transistor 412 and the plate voltage VP. A plurality of cells, each of which includes an access transistor 412 and a cell capacitor 421, is connected to the word line WL1, so that the first memory block 2821 of FIG. 4 may be configured with the same number of cells as buffer block 281. This configuration continues for multiple word lines and access transistors through to an access transistor 41n that is connected to a word line WLn and the bit line BL, and a cell capacitor 42n that is connected between an access transistor 41n and the plate voltage VP. A plurality of cells, each of which includes an access transistor 41n and a cell capacitor 42n, is connected to the word line WLn, so that the $n^{TH}$ memory block 282n may be configured.

Figure 8A:
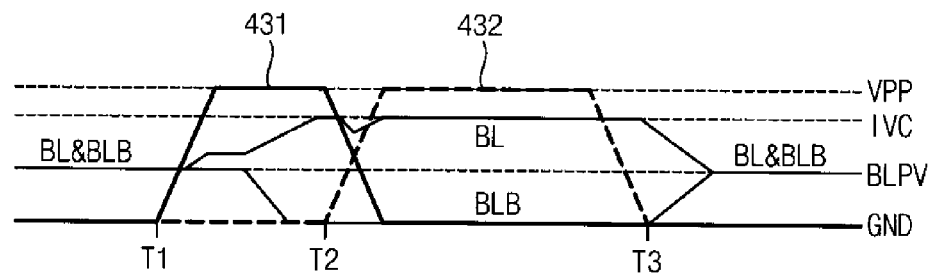
FIGS. 8A and 8B are timing diagrams showing a voltage of a memory device corresponding to FIG. 7 in a block copy operation according to example embodiments.

Referring now to FIG. 8A, the block copy operation according to example embodiments will be described also with reference to FIGS. 4A and 7.

Figure 8B:
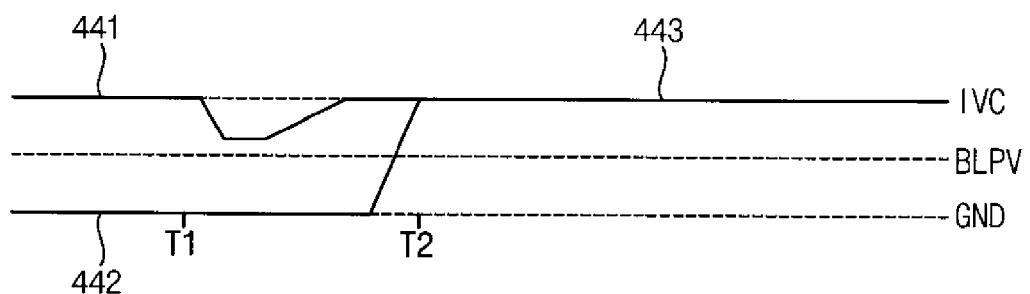

For this example, data of D1 corresponding to the logic high level is stored in the cell capacitor 421 of FIG. 7, which is one of the memory cells included in the first memory block 2821 as the source block. Data of D0 is stored in the cell capacitor 420, which is one of the memory cells included in the buffer block 281 as the destination block. As shown in FIG. 8A, before T1, the bit line BL and the complementary bit line BLB are precharged to a precharge voltage BLPV. By activating the word line WL1 connected to the source block 2821 with VPP level at T1 as shown by reference number 431, the data D1 stored in the cell capacitor 412 is sensed through the sensing amplifier 405 of FIG. 7. By inactivating the word line WL1 connected to the source block 2821 at T2 and, at the same time, activating the word line BWL connected to the destination block 281, as shown by reference numbers 431 and 432, the data of D1 sensed by the sensing amplifier 405 is overwritten into the cell capacitor 420. By inactivating the word line BWL connected to the destination block 281 with a ground level at T3, the block copy operation is completed. Since this operation is performed in all of the cells in a row (alternatively referred to as a block or region) and corresponding bit line sensing amplifiers are connected to the word line WL1 and the buffer word line BWL, the data stored in the memory block 2821 may thus be copied into the buffer block 281. Referring now to FIG. 8B, the reference numeral 441 denotes a voltage of a node N1 of FIG. 7, which is a source block, and reference numeral 442 denotes a voltage of node N2, which is a destination block. When the block copy operation is completed, the voltage of node N2 has a level of an internal power source voltage IVC as denoted by reference number 443, and the bit line BL and the complementary bit line BLB have a level of a bit line precharge voltage BLPV as shown in FIG. 8A after T3. A plurality of bit line sensing amplifiers may be referred to as a block copy circuit.

Figure 9:
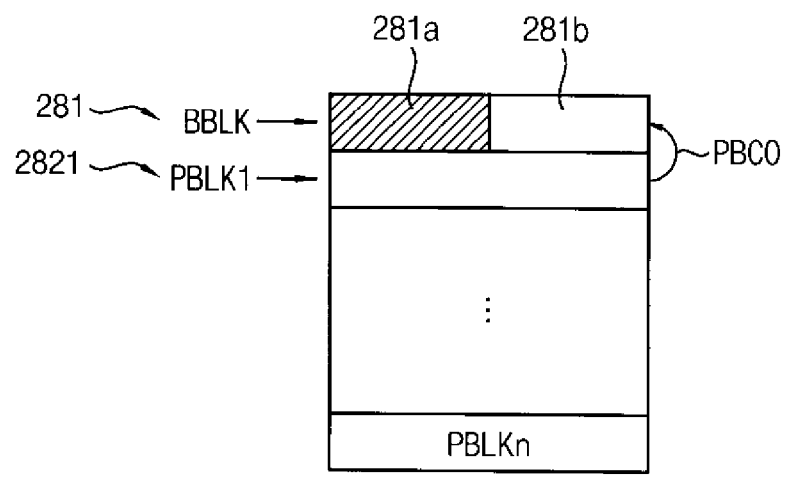
FIG. 9 is a diagram illustrating a partial-block copy operation in a memory device according to example embodiments.

Referring now to FIG. 9, an example is shown when the data of the first memory block 2821 (PBLK1), which is a source block, is copied into the buffer block 281 (BBLK), which is a destination block. In FIG. 9, reference number 281a denotes a portion in which a partial copy operation is completed so that a data copy is completed, and reference number 281b denotes a portion in which a partial copy operation is not completed. The block copy unit 350 performs the partial copy operation multiple times, so that the corresponding physical address in the mapping table is updated for the physical address of the buffer block BBLK after all of the data of the first memory block 2821 as a source block is copied into the buffer block BBLK as a destination block. It may be appreciated that in various embodiments a block copy unit such as unit 350 may perform various block copy operations such as one that performs a partial copy operation of less than a single block, a block copy operation that copies a single block completely in a single operation, and/or a block copy operation that copies multiple blocks.

Figure 10:
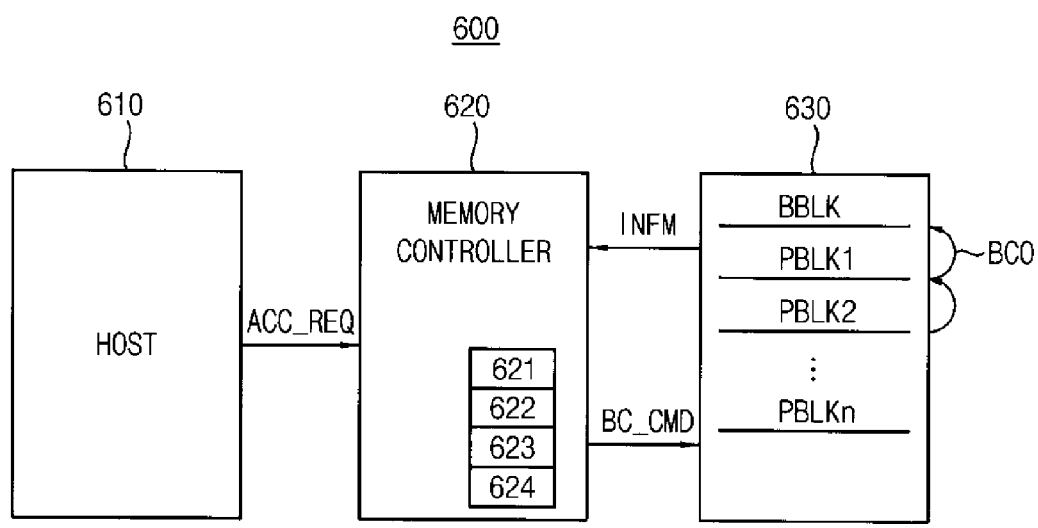
FIG. 10 is a block diagram showing an embodiment of a memory system.

Referring now to FIG. 10, a memory system 600 may include a host 610, a memory controller 620 and a semiconductor memory device 630.

The memory controller 620 accesses and controls the semiconductor memory device 630 according to an access request from the host 610. The memory controller 620 includes a plurality of tables 621 to 624 which receive and store information INFM about a physical configuration, an index of indicating a mapping state, repair state and an address mapping from the semiconductor memory device 630. The table 621 may store the information about the repairs of the memory cells therein. The table 622 may store the mapping index therein. The table 623 may store the address mapping therein. The table 624 may store the information about the physical configuration of the memory cells therein.

The semiconductor memory device 630 includes at least one buffer block BBLK and a memory cell array having a plurality of memory blocks PBLK1 to PBLKn, and performs the above-described block copy operation in response to a block copy command BC_CMD from the memory controller 620. The at least one buffer block BBLK may be implemented by using a set of cells of the semiconductor memory device 630. The block copy operation may be performed at once for one block, or may be performed by repeating the above described partial block copy operation several times. When the partial block copy operation is performed, a writing and read-out function may be used between the memory controller 620 and the semiconductor memory device 630. Thus, when the partial block copy operation is performed, the memory controller 620 may not use the physical configuration and repair information. When the semiconductor memory device 630 includes the address converting circuit 300 of FIG. 4 and converts a logical address into a physical address of the memory cells according to the access request ACC_REQ of the host 610, the semiconductor memory device 630 performs the above-described block copy operation. In addition, since the corresponding physical address is updated, even if the accesses are concentrated to a specific logical address, the semiconductor memory device 630 can uniformly distribute the concentrated accesses across multiple physical blocks of the memory device.

Figure 11:
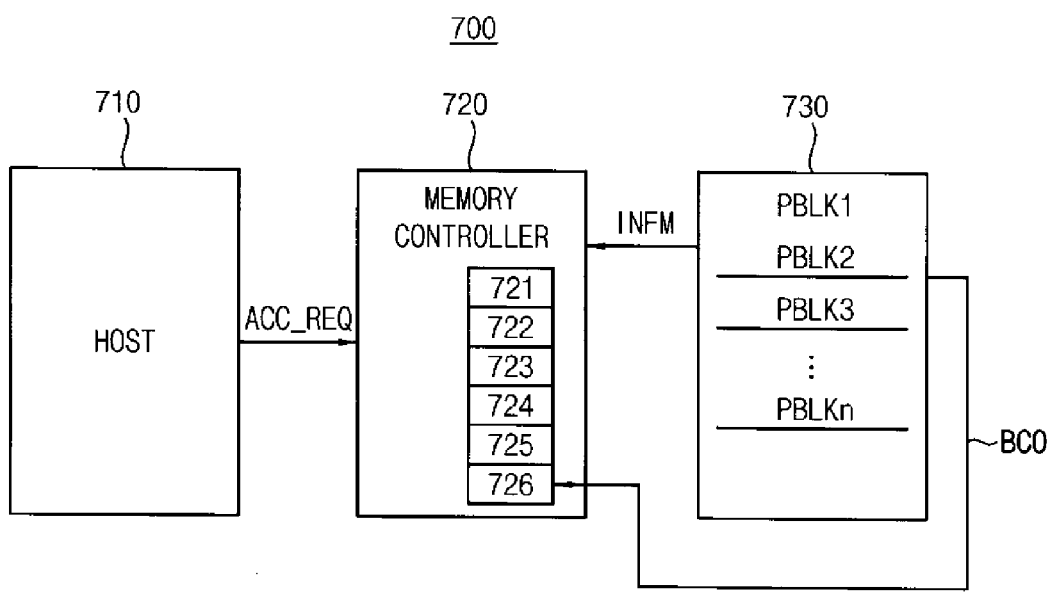
FIG. 11 is a block diagram showing another embodiment of a memory system.

Referring now to FIG. 11, a memory system 700 may include a host 710, a memory controller 720 and a semiconductor memory device 730.

The memory controller 720 accesses and controls the semiconductor memory device 730 according to an access request from the host 710. The memory controller 720 includes a plurality of tables 721 to 724 which receive and store information INFM about a physical configuration, an index of indicating a mapping state, repair state and an address mapping from the semiconductor memory device 730. The table 721 may store the information about the repairs of the memory cells therein. The table 722 may store the mapping index therein. The table 723 may store the address mapping therein. The table 724 may store the information about the physical configuration of the memory cells therein.

Further, the memory controller 720 may further include a block copy unit 725 and a buffer block 726. The buffer block 726 may be implemented, for example, by using an SRAM or registers. The semiconductor memory device 730 includes a memory cell array having a plurality of memory blocks BLK1 to BLKn, and performs a block copy operation of copying the data of one of the memory blocks BLK1 to BLKn to the buffer block 726 of the memory controller 720 under the control of the block copy unit 725. The block copy operation may be performed once for one block, or may be performed by repeating the above described partial block copy operation several times. When the partial block copy operation is performed, a writing and read-out function may be used between the memory controller 720 and the semiconductor memory device 730. Thus, when the partial block copy operation is performed, the memory controller 720 may not use the physical configuration and repair information.

When the memory controller 720 and the semiconductor memory device 730 include the address converting circuit 300a of FIG. 4A or the address converting circuit 300b of FIG. 4B and converts logical addresses into physical addresses of the memory cells according to the access request ACC_REQ of the host 710, the memory controller 720 and the semiconductor memory device 730 perform the above-described block copy operation. In addition, since the corresponding physical address is updated, even if the accesses are concentrated to a specific logical address, the memory controller 720 and the semiconductor memory device 730 can uniformly distribute the concentrated accesses across multiple physical blocks of the memory device 730.

Figure 12:
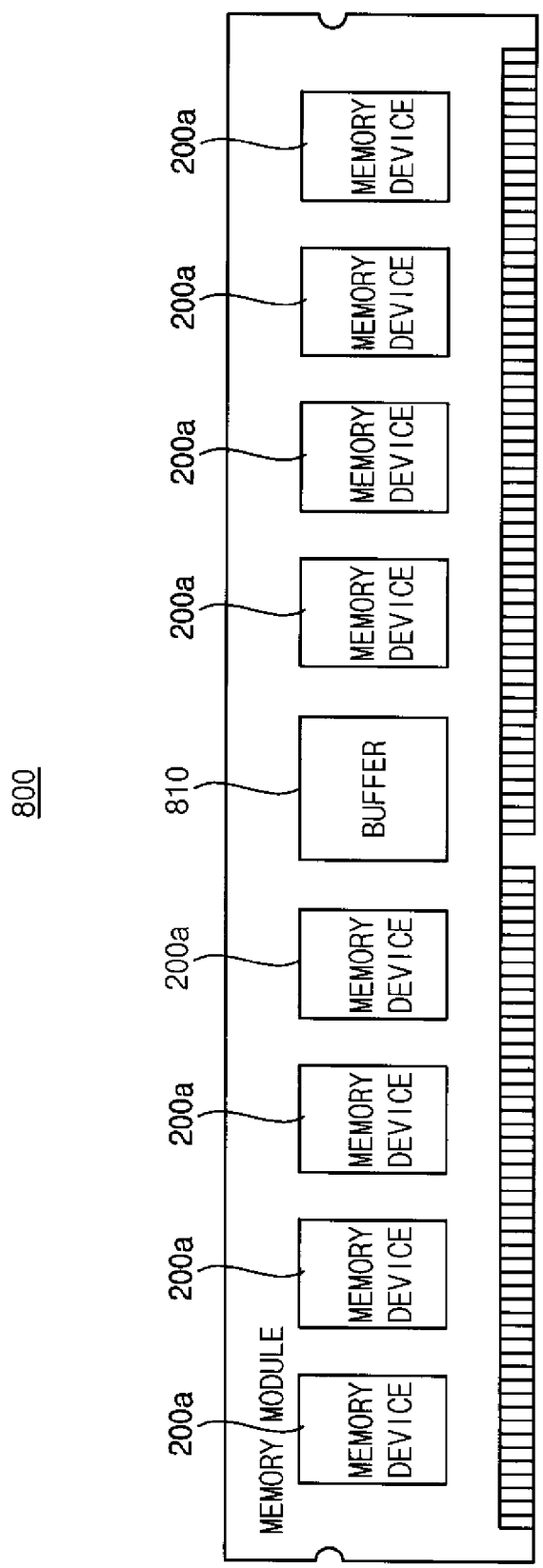
FIG. 12 is a block diagram of an embodiment of a memory module.

Referring to FIG. 12, a memory module 800 may include a plurality of semiconductor memory devices 200a. In some embodiments, the memory module 800 may be an unbuffered dual in-line memory module (UDIMM), a registered dual in-line memory module (RDIMM), a fully buffered dual in-line memory module (FBDIMM), a load reduced dual in-line memory module LRDIMM, etc.

The memory module 800 may further a buffer 810 that provides a command/address signal and data by buffering the command/address signal and the data from a memory controller through a plurality of transmission lines. In some embodiments, data transmission lines between the buffer 810 and the semiconductor memory devices 200a may be coupled in a point-to-point topology, and command/address transmission lines between the buffer 810 and the semiconductor memory devices 200a may be coupled in a multi-drop topology, a daisy-chain topology, a fly-by daisy-chain topology, or the like. Since the buffer 810 buffers both the command/address signal and the data, the memory controller may interface with the memory module 800 by driving only a load of the buffer 810. Accordingly, the memory module 800 may include more memory devices and/or memory banks, and a memory system may include more memory modules.

Each of the semiconductor memory devices 200a may include the address converting circuit 300a in FIG. 4A or the address converting circuit 300b in FIG. 4B, and may perform the block copy operation when converting the logical address into a physical address of a memory cell according to an access request, and updates the corresponding physical address, thereby achieving uniform wear-leveling even though a logical address may be intensively accessed.

Figure 13:
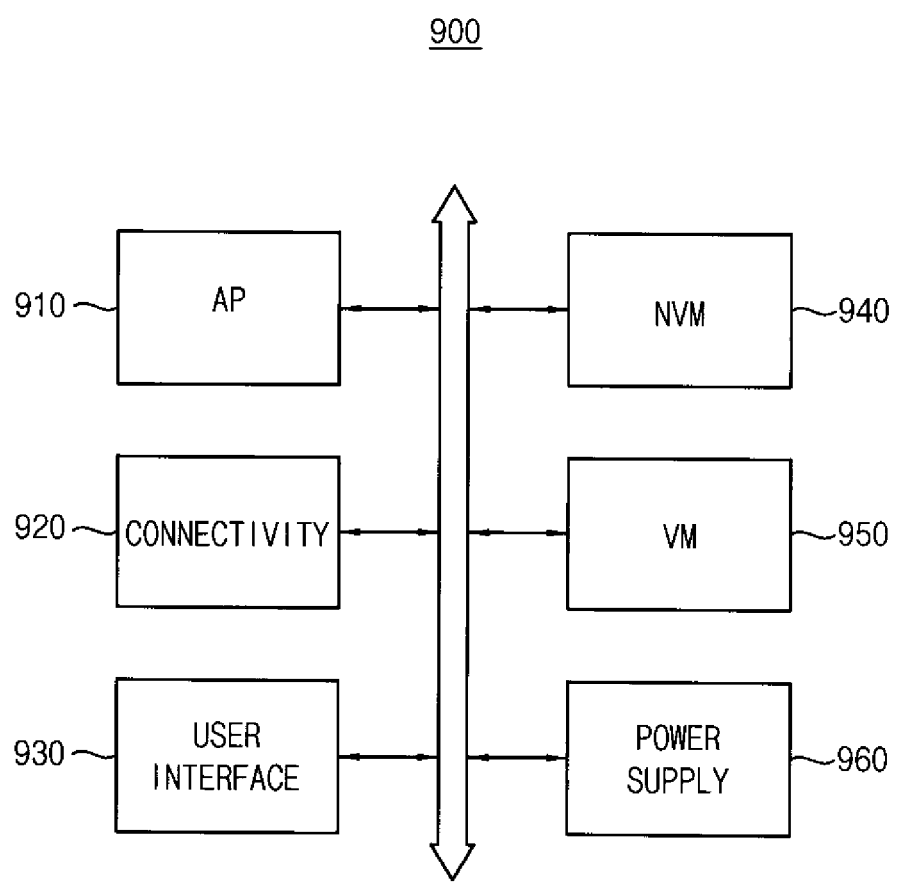
FIG. 13 is a block diagram illustrating a mobile system according to example embodiments.

Referring to FIG. 13, a mobile system 900 includes an application processor 910, a connectivity unit 920, a semiconductor memory device 950, a nonvolatile memory device 940, a user interface 930 and a power supply 960. In some embodiments, the mobile system 900 may be a mobile phone, a smart phone, a personal digital assistant (PDA), a portable multimedia player (PMP), a digital camera, a music player, a portable game console, a navigation system, etc.

The application processor 910 may execute applications, such as a web browser, a game application, a video player, etc. In some embodiments, the application processor 910 may include a single core or multiple cores. For example, the application processor 910 may be a multi-core processor, such as a dual-core processor, a quad-core processor, a hexa-core processor, etc. The application processor 910 may include an internal or external cache memory.

The connectivity unit 920 may perform wired or wireless communication with an external device. For example, the connectivity unit 920 may perform Ethernet communication, Near Field Communication (NFC), Radio Frequency Identification (RFID) communication, mobile telecommunication, memory card communication, Universal Serial Bus (USB) communication, etc. In some embodiments, connectivity unit 920 may include a baseband chipset that supports communications, such as Global System for Mobile Communications (GSM), General Packet Radio Service (GPRS), Wideband Code Division Multiple Access (WCDMA), High Speed Downlink/Uplink Packet Access (HSxPA), etc.

The semiconductor memory device 950 may store data processed by the application processor 910, or may operate as a working memory. For example, the semiconductor memory device 950 may be a dynamic random access memory, such as DDR SDRAM, LPDDR SDRAM, GDDR SDRAM, RDRAM, etc., or may be any volatile memory device that requires a refresh operation. The semiconductor memory device 950 may include the address converting circuit 300a in FIG. 4A or the address converting circuit 300b in FIG. 4B, and may perform the block copy operation when converting the logical address into a physical address of a memory cell according to an access request, and updates the corresponding physical address, thereby achieving uniform wear-leveling even though a logical address is intensively accessed.

The nonvolatile memory device 940 may store a boot image for booting the mobile system 900. For example, the nonvolatile memory device 940 may be an Electrically Erasable Programmable Read-Only Memory (EEPROM), a flash memory, a Phase Change Random Access Memory (PRAM), a Resistance Random Access Memory (RRAM), a Nano Floating Gate Memory (NFGM), a Polymer Random Access Memory (PoRAM), a Magnetic Random Access Memory (MRAM), a Ferroelectric Random Access Memory (FRAM), etc.

The user interface 930 may include at least one input device, such as a keypad, a touch screen, etc., and at least one output device, such as a speaker, a display device, etc. The power supply 960 may supply a power supply voltage to the mobile system 900. In some embodiments, the mobile system 900 may further include a camera image sensor (CIS), and/or a storage device, such as a memory card, a solid state drive (SSD), a hard disk drive (HDD), a CD-ROM, etc.

In some embodiments, the mobile system 900 and/or components of the mobile system 900 may be packaged in various forms, such as package on package (PoP), ball grid arrays (BGAs), chip scale packages (CSPs), plastic leaded chip carrier (PLCC), plastic dual in-line package (PDIP), die in waffle pack, die in wafer form, chip on board (COB), ceramic dual in-line package (CERDIP), plastic metric quad flat pack (MQFP), thin quad flat pack (TQFP), small outline IC (SOIC), shrink small outline package (SSOP), thin small outline package (TSOP), system in package (SIP), multi chip package (MCP), wafer-level fabricated package (WFP), or wafer-level processed stack package (WSP).

Figure 14:
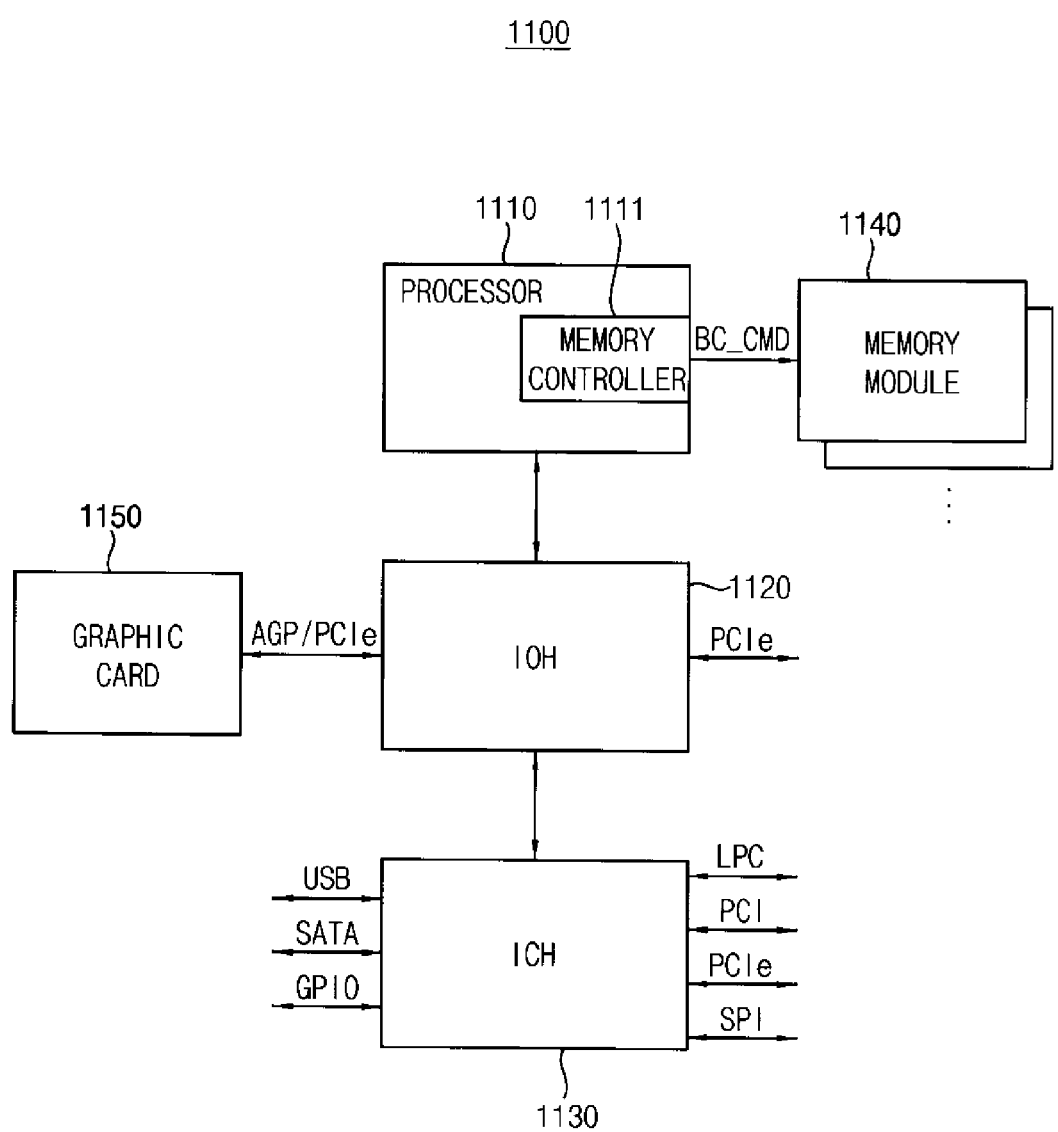
FIG. 14 is a block diagram illustrating a computing system according to example embodiments.

Referring to FIG. 14, a computing system 1100 includes a processor 1110, an input/output hub (IOH) 1120, an input/output controller hub (ICH) 1130, at least one memory module 1140 and a graphics card 1150. In some embodiments, the computing system 1100 may be a personal computer (PC), a server computer, a workstation, a laptop computer, a mobile phone, a smart phone, a personal digital assistant (PDA), a portable multimedia player (PMP), a digital camera), a digital television, a set-top box, a music player, a portable game console, a navigation system, etc.

The processor 1110 may perform various computing functions, such as executing specific software for performing specific calculations or tasks. For example, the processor 1110 may be a microprocessor, a central process unit (CPU), a digital signal processor, or the like. In some embodiments, the processor 1110 may include a single core or multiple cores. For example, the processor 1110 may be a multi-core processor, such as a dual-core processor, a quad-core processor, a hexa-core processor, etc. Although FIG. 14 illustrates the computing system 1100 including one processor 1110, in some embodiments, the computing system 1100 may include a plurality of processors. The processor 1110 may include an internal or external cache memory.

The processor 1110 may include a memory controller 1111 for controlling operations of the memory module 1140. The memory controller 1111 included in the processor 1110 may be referred to as an integrated memory controller (IMC). The memory controller 1111 may include structure and/or perform the methods of one or more of the embodiments described herein. A memory interface between the memory controller 1111 and the memory module 1140 may be implemented with a single channel including a plurality of signal lines, or may bay be implemented with multiple channels, to each of which at least one memory module 1140 may be coupled. In some embodiments, the memory controller 1111 may be located inside the input/output hub 1120, which may be referred to as memory controller hub (MCH).

The memory module 1140 may include a plurality of semiconductor memory devices that store data provided from the memory controller 1111. Each of the semiconductor memory devices may include the address converting circuit 300a in FIG. 4A or the address converting circuit 300b in FIG. 4B, perform the block copy operation when converting the logical address into a physical address of a memory cell according to an access request, and update the corresponding physical address, thereby achieving uniform wear-leveling even though a logical address is intensively accessed.

The input/output hub 1120 may manage data transfer between processor 1110 and devices, such as the graphics card 1150. The input/output hub 1120 may be coupled to the processor 1110 via various interfaces. For example, the interface between the processor 1110 and the input/output hub 1120 may be a front side bus (FSB), a system bus, a HyperTransport (also known as a Lightning Data Transport (LDT), a QuickPath Interconnect (QPI), a Common System Interface (CSI), etc. Although FIG. 14 illustrates the computing system 1100 including one input/output hub 1120, in some embodiments, the computing system 1100 may include a plurality of input/output hubs. The input/output hub 1120 may provide various interfaces with the devices. For example, the input/output hub 1120 may provide an Accelerated Graphics Port (AGP) interface, a Peripheral Component Interconnect-Express (PCIe), a Communications Streaming Architecture (CSA) mechanism, etc.

The graphics card 1150 may be coupled to the input/output hub 1120 via AGP or PCIe. The graphics card 1150 may control a display device (not shown) for displaying an image. The graphics card 1150 may include an internal processor for processing image data and an internal memory device. In some embodiments, the input/output hub 1120 may include an internal graphics device along with or instead of the graphics card 1150 outside the graphics card 1150. The graphics device when included in the input/output hub 1120 may be referred to as integrated graphics. Further, the input/output hub 1120 when it includes the internal memory controller and the internal graphics device may be referred to as a Graphics and Memory Controller Hub (GMCH).

The input/output controller hub 1130 may perform data buffering and interface arbitration to efficiently operate various system interfaces. The input/output controller hub 1130 may be coupled to the input/output hub 1120 via various means such as an internal bus, such as a Direct Media Interface (DMI), a hub interface, an Enterprise Southbridge Interface (ESI), PCIe, etc. The input/output controller hub 1130 may provide various interfaces with peripheral devices. For example, the input/output controller hub 1130 may provide a Universal Serial Bus (USB) port, a Serial Advanced Technology Attachment (SATA) port, a General Purpose Input/Output (GPIO), a Low Pin Count (LPC) bus, a Serial Peripheral Interface (SPI), PCI, PCIe, etc.

In some embodiments, the processor 1110, the input/output hub 1120 and the input/output controller hub 1130 may be implemented as separate chipsets or separate integrated circuits. In other embodiments, at least two of the processor 1110, the input/output hub 1120 and the input/output controller hub 1130 may be implemented as a single chipset.

As mentioned above, in various embodiments, when converting the logical address into a physical address of a memory cell according to an access request, the block copy operation is performed and the corresponding physical address is updated. Thus, even though a logical address is intensively accessed, the accesses can be uniformly distributed in the memory cell array. In addition, since the address may be continuously changed while the system is powered on, uniform wear-leveling can be achieved regardless of applications.

The example embodiments may be applied to a system using a semiconductor memory device. For example, the disclosed embodiments may be used in any device or system including a nonvolatile memory device, such as a mobile phone, a smart phone, a PDA, a PMP, a digital camera, a digital television, a set-top box, a music player, a portable game console, a navigation device, a PC, a server computer, a workstation, a tablet computer, a laptop computer, a smart card, a printer, etc.

The foregoing is illustrative of exemplary embodiments and is not to be construed as limiting thereof. Although a few exemplary embodiments have been described, those skilled in the art will readily appreciate that many modifications are possible in the exemplary embodiments without materially departing from the novel teachings and advantages of the present inventive concept. Accordingly, all such modifications are intended to be included within the scope of the present inventive concept as defined in the claims.

What is claimed is:

1. A semiconductor memory device comprising:
a memory cell array that includes a plurality of memory blocks, each memory block including at least one memory cell row;
a block copy circuit including a shared bit line sense amplifier coupled to the memory cell rows of each of the memory blocks, the block copy circuit configured to perform a block copy operation including copying data of a first memory block to a second memory block in response to a block copy command received from a memory controller external to the semiconductor memory device, wherein the block copy operation includes overwriting data in the second memory block with data of the first memory block;
an address converter coupled to the block copy circuit and configured to map a logical address for the first memory block to a physical address of the second memory block and to use each of the plurality of memory blocks as the first block in response to a plurality of memory access requests from a host system in a manner such that over time access to each memory block in the memory array is uniformly distributed,
wherein the semiconductor memory device is a dynamic random access memory (DRAM),
wherein the block copy circuit is configured to perform a partial copy operation to overwrite a portion of the first memory block to the second memory block when the block copy operation is performed, wherein the portion includes data less than all data of the first memory block, and
wherein the block copy circuit is configured to repeat the partial copy operation until all data of the first memory block are copied to the second memory block and to update an entry in a mapping table included in the address converter with the physical address of the second memory block after all data of the first memory block are copied.

2. The semiconductor memory device of claim 1, wherein the address converter is configured to perform the block copy operation sequentially for a plurality of memory blocks and to map logical addresses of each memory block as the first block to physical addresses of corresponding second blocks after each corresponding block copy operation is completed.

3. The semiconductor memory device of claim 1, wherein the mapping table is configured to store physical addresses that designate the memory blocks and logical addresses corresponding to the physical addresses, respectively, the address converter comprises:

a circuitry configured to update a corresponding physical address stored in the mapping table after the block copy operation is completed; and
an address mapping unit configured to map logical addresses for accessing the memory blocks to physical addresses based on the mapping table.

4. The semiconductor memory device of claim 3, wherein the address converter is configured to update a physical address of the first memory block stored in the mapping table to a physical address of the second memory block after the block copy operation for the first memory block is completed.

5. The semiconductor memory device of claim 1, further comprising a mapping calculation unit configured to generate a mapping index of the first memory block wherein the address converter is configured to map the logical address for the first memory block to the physical address of the second memory block based on the mapping index.

6. The semiconductor memory device of claim 5, wherein the mapping index comprises a pointer.

7. The semiconductor memory device of claim 1, wherein the block copy circuit is further configured to perform the block copy operation in response to a refresh command for the memory cell array.

8. The semiconductor memory device of claim 1, further comprising control logic configured to sequentially make each memory block of the plurality of memory blocks available as a first block, whereby after a sequence of block copy operations reaches a number equal to the number of memory blocks in the plurality of memory blocks then the block copy operation has used each memory block as a first block.

9. The semiconductor memory device of claim 1, wherein the block copy circuit is configured to activate a source word line connected to a memory cell of the first memory block to allow the bit line sensing amplifier to sense data and then to deactivate the source word line while activating a destination word line connected to a corresponding memory cell of the second memory block to write the sensed data.

10. A memory system comprising:
a DRAM that includes a memory cell array that includes a plurality of memory blocks, each block comprising a memory cell row;
a plurality of bit line sense amplifiers, each bit line sense amplifier coupled to the memory cell row in each of the plurality of memory blocks; and
a memory controller comprising a block copy unit configured to perform a block copy operation of copying data of a source memory block of the memory cell array to a buffer memory block and an address converting unit configured to map a logical address for the source memory block to a physical address of the buffer memory block, the memory controller further configured to make the source memory block available as a destination block for receiving data after completion of the block copy operation, wherein the block copy operation includes overwriting data in the buffer memory block with data of the source memory block, and
wherein the address converting unit is further configured to use each of the plurality of memory blocks as a first block in response to a plurality of memory access requests from a host system in a manner such that over time access to each memory block in the memory array is uniformly distributed,
wherein the block copy unit is configured to perform a partial copy operation to overwrite a portion of the source memory block to the buffer memory block when the block copy operation is performed, wherein the portion includes data less than all data of the source memory block, and wherein the block copy unit is configured to repeat the partial copy operation until all data of the source memory block are copied to the buffer memory block and to update an entry in a mapping table with the physical address of the buffer memory block after all data of the source memory block are copied.

11. The memory system of claim 10, wherein the buffer block is included in the memory cell array.

12. A method of distributing physical accesses in a semiconductor memory device comprising:
  (a) providing a DRAM that includes a memory array comprising plurality of memory blocks, each memory block comprising at least one row of memory cells;
  (b) providing a bit line sense amplifier coupled to the plurality of memory blocks;
  (c) reading data from a first memory block using the bit line sense amplifier;
  (d) writing the data obtained from reading from the first memory block to a second memory block using the bit line sense amplifier, thereby copying a source block to a destination block, wherein copying includes overwriting data in the destination block with data of the source block; and
  (e) mapping a logical address for the first memory block to a physical address for the second memory block;
  (f) providing a memory controller coupled to the memory array; and
  (g) controlling determination of second memory block addresses with the controller so that over time, in response to accesses of the memory array by a host system, writing operation in each memory block in the memory array is uniformly distributed, wherein step (d) further comprising:
  performing a partial copy operation to overwrite a portion of the first memory block to the second memory block, wherein the portion includes data less than all data of the first memory block;
  repeating the performing a partial copy operation until all data of the first memory block are copied to the second memory block; and
  updating an entry in a mapping table with the physical address of the second memory block after all data of the first memory block are copied.

13. The method of claim 12, further comprising performing steps (c), (d) and (e) for each memory block in the plurality of memory blocks as a second block in response to a consecutive number of accesses of the memory array by a host system of logical addresses of memory blocks, wherein each of the memory blocks is used as the source block.

14. The method of claim 12, further comprising performing steps (c), (d) and (e) for each memory block in the plurality of memory blocks in a predetermined pattern of physical addresses for second memory blocks.

15. The method of claim 14, further comprising:
  providing a memory controller coupled to the memory array; and
  controlling the determination of second memory block addresses with the controller so that each memory block in the memory array is written to sequentially in response to a consecutive number of accesses of the memory array by a host system.

\* \* \* \* \*